(12) United States Patent
Challener et al.

(10) Patent No.: US 6,546,491 B1
(45) Date of Patent: Apr. 8, 2003

(54) SECURING MOBILE COMPUTER SYSTEMS IN A CORPORATE ENVIRONMENT

(75) Inventors: David C. Challener, Raleigh, NC (US); Kenneth D. Timmons, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,297

(22) Filed: Mar. 19, 1999

(51) Int. Cl.$^7$ ................................. H04L 9/00
(52) U.S. Cl. ........................ 713/200; 713/201
(58) Field of Search ................. 713/200, 202, 713/2, 183; 340/5.3, 5.61; 109/2, 9, 21

(56) References Cited

U.S. PATENT DOCUMENTS

| | | | | |
|---|---|---|---|---|
| 5,400,722 A | * | 3/1995 | Moses et al. | 109/2 |
| 5,402,492 A | * | 3/1995 | Goodman et al. | 713/166 |
| 5,892,906 A | * | 4/1999 | Chou et al. | 713/2 |
| 5,970,227 A | * | 10/1999 | Dayan et al. | 340/5.3 |
| 6,286,102 B1 | * | 9/2001 | Cromer et al. | 713/200 |

FOREIGN PATENT DOCUMENTS

| | | | |
|---|---|---|---|
| JP | 02000259571 A | * | 9/2000 |
| JP | 02000311024 A | * | 11/2000 |

* cited by examiner

*Primary Examiner*—Ly V. Hua
(74) *Attorney, Agent, or Firm*—Sawyer Law Group, LLP; Carlos Munoz-Bustamante

(57) ABSTRACT

The present invention provides a method and system for securing a computer. The method includes providing a zone of authorized operation for the computer; determining if a possessor of the computer is authorized to have possession when the computer and the possessor leaves the zone of authorized operation and pass through a portal; and allowing continued access to the computer without requiring a password if the possessor is authorized. The method and system is transparent to the possessor and provides no advantage in hiding the computer from the portal. This method and system may be easily applied in a corporate environment and is particularly apt for securing mobile computer systems.

43 Claims, 4 Drawing Sheets

SECURING MOBILE COMPUTER SYSTEMS IN A CORPORATE ENVIRONMENT

FIELD OF THE INVENTION

The present invention relates to computer systems, and more particularly to securing personal computer systems in a corporate environment.

BACKGROUND OF THE INVENTION

Today, securing computer systems from theft and unauthorized use is very important to businesses. Of particular concern is the securing of mobile computers, or "laptop" computers. Due to their portability, they are particularly susceptible to theft. Two approaches to this problem has been proposed by INTERNATIONAL BUSINESS MACHINES CORPORATION, the assignee of the present application.

FIG. 1 illustrates a first possible approach to securing mobile computers. In this first approach, the laptop computer 104 has an identification (ID) tag 102, and the possessor 108 of the laptop computer 104 has an ID tag 106 as well. These ID tags 102, 106 are detected via a radio signal when they move through a portal 110. A "portal", as used in this specification, refers to a location through which a possessor 108 in possession of a laptop computer 104 may pass through. For example, a corporation may place a portal 110 at possible exists from its office building. When a portal 110 detects the ID tags 102 and 106, it checks if the identified possessor 108 has authority to possess the identified laptop computer 104. If not, then the laptop computer 104 is locked by the portal 110 through a radio signal from the portal 110 to the laptop computer 104. Thus, an unauthorized possessor who transports a laptop computer past a portal will not be able to operate the laptop. However, with this approach, the locking of the laptop computer 104 may be avoided by transporting the computer 104 in a Faraday cage, for example a metal briefcase, or by positioning an antenna in a particular direction such that the computer's ID tag 102 is not seen by the portal 110. The portal 110 thus never detects the transport of the laptop computer 104, and it is never locked.

FIG. 2 illustrates a second possible approach. In this approach, a zone of authorized operation 202 is defined within which the laptop computer 204 is freely operable. The zone of authorized operation 202 will be defined by a radio beacon 206 which continuously emits a radio signal. The laptop computer 204 would be equipped with a radio frequency listening device 208 which can hear the signal from the radio beacon 206. When the laptop computer 204 hears the signal, it is operable. However, when the laptop computer 204 is transported outside the zone 202, it will not hear the signal, at which time it will lock itself. To operate the locked laptop computer 204, a possessor 206 of the laptop computer 204 must enter a valid password. However, this approach is unfriendly to the possessor 206 since the possessor must remember passwords. It is also breakable via social engineering if the passwords are not chosen securely.

Accordingly, what is needed is a system and method for securing computers which is possessor friendly and is more reliable than current possible approaches. The method and system should be easily applied in a corporate environment. The present invention addresses such a need.

SUMMARY OF THE INVENTION

The present invention provides a method and system for securing a computer. The method includes providing a zone of authorized operation for the computer; determining if a possessor of the computer is authorized to have possession when the computer and the possessor leaves the zone of authorized operation and pass through a portal; and allowing continued access to the computer without requiring a password if the possessor is authorized. The method and system is transparent to the possessor and provides no advantage in hiding the computer from the portal. This method and system may be easily applied in a corporate environment and is particularly apt for securing mobile computer systems.

DETAILED DESCRIPTION

The present invention relates to a method and system for securing computers in a corporate environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
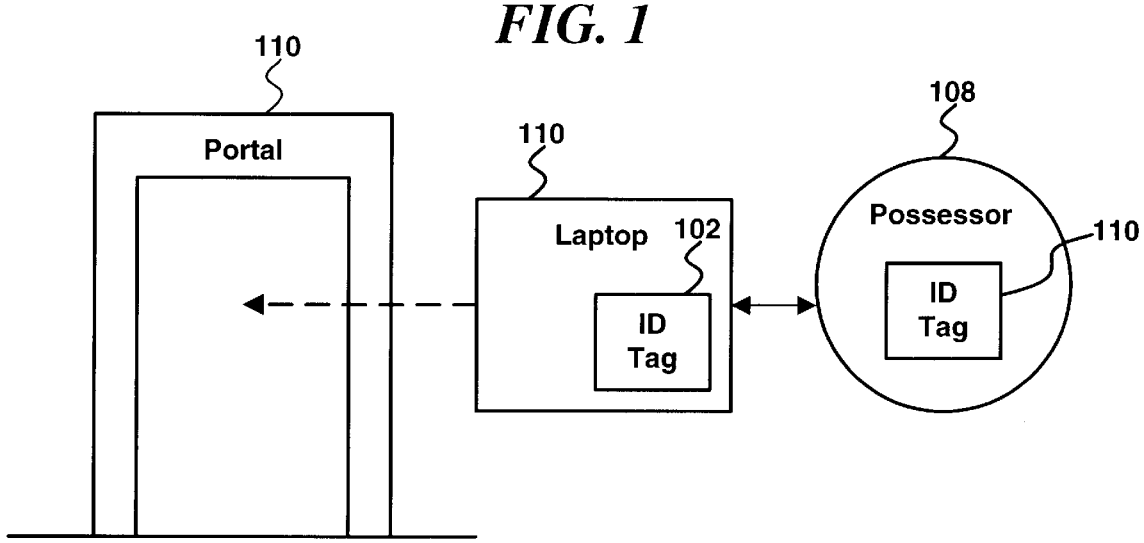
FIG. 1 illustrates one possible approach for securing a computer in a corporate environment.
Figure 2:
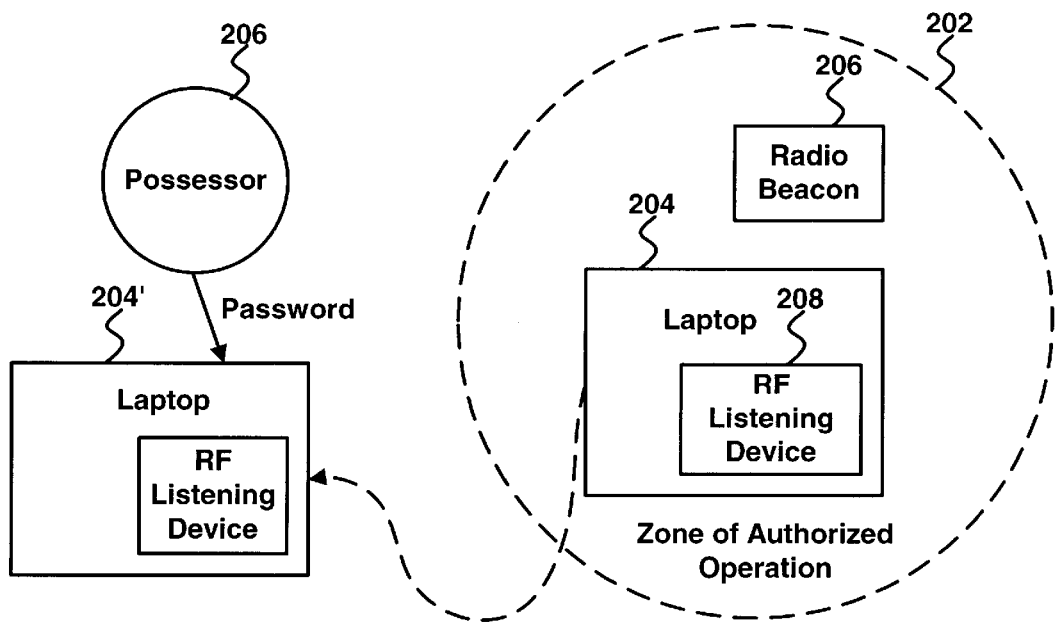
FIG. 2 illustrates a second possible approach for securing a computer in a corporate environment.
Figure 3:
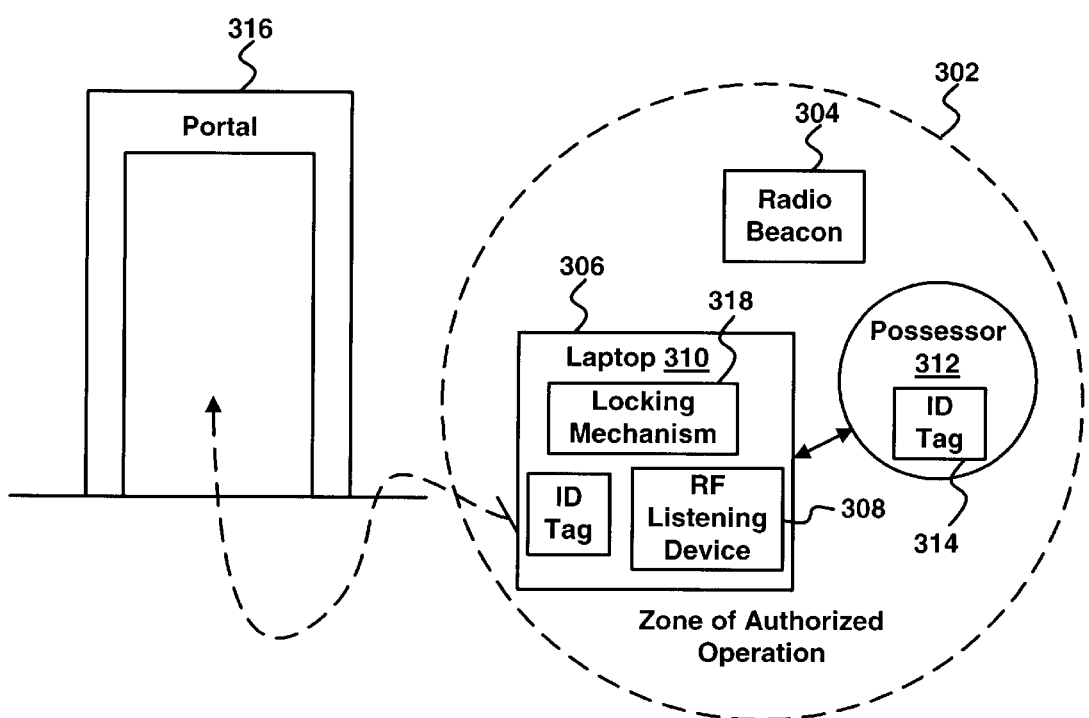
FIG. 3 illustrates a security system which uses a method for securing a computer in accordance with the present invention.

FIG. 3 illustrates a preferred embodiment of a security system 300 which uses a method for securing computers in accordance with the present invention. The security system 300 comprises a zone of authorized operation 302 defined, for example, by a radio beacon 304; a computer 306 with a radio frequency listening device 308, an identification (ID) tag 310, and a locking mechanism 318 for locking the operation of the computer 306; a possessor 312 of the computer 306 with an ID tag 314; and a portal 316. The zone of authorized operation 302 is the area within which the computer 306 is freely operable regardless of the possessor. For example, the zone 302 may be the inside of an office building of a corporation or a portion of the building which houses a particular department in the corporation. The radio beacon 304 emits a radio signal. The range of the signal defines the zone 302. The computer 306 may be a mobile computer system, such as a laptop computer. The ID tag 310 may be a radio frequency ID tag which identifies the laptop computer 306, and the possessor ID tag 314 may be a radio frequency ID tag which identifies the possessor. The portal is a location through which the possessor 312 and the laptop computer 306 may pass and is equipped to obtain the ID of the computer 310 and the possessor 314 and to send a signal to the computer 306. The portal is also equipped to detect whether or not the computer 306 and the possessor 312 is leaving through the portal 316 or entering through the portal 316. For example, separate portals 316 may be used as an exit and an entrance, or a portal 316 may have sensor which determines the direction in which the computer 306 and the possessor 316 is traveling. A security system 300 may contain more than one portal 316. The portal(s) 316 are located strategically such that they may detect unauthorized possessions of the laptop computer 306.

To illustrate how the security system 300 uses the method for securing computers in accordance with the present invention, please refer to FIGS. 4 and 5 in conjunction with the discussion below.

Figure 4:
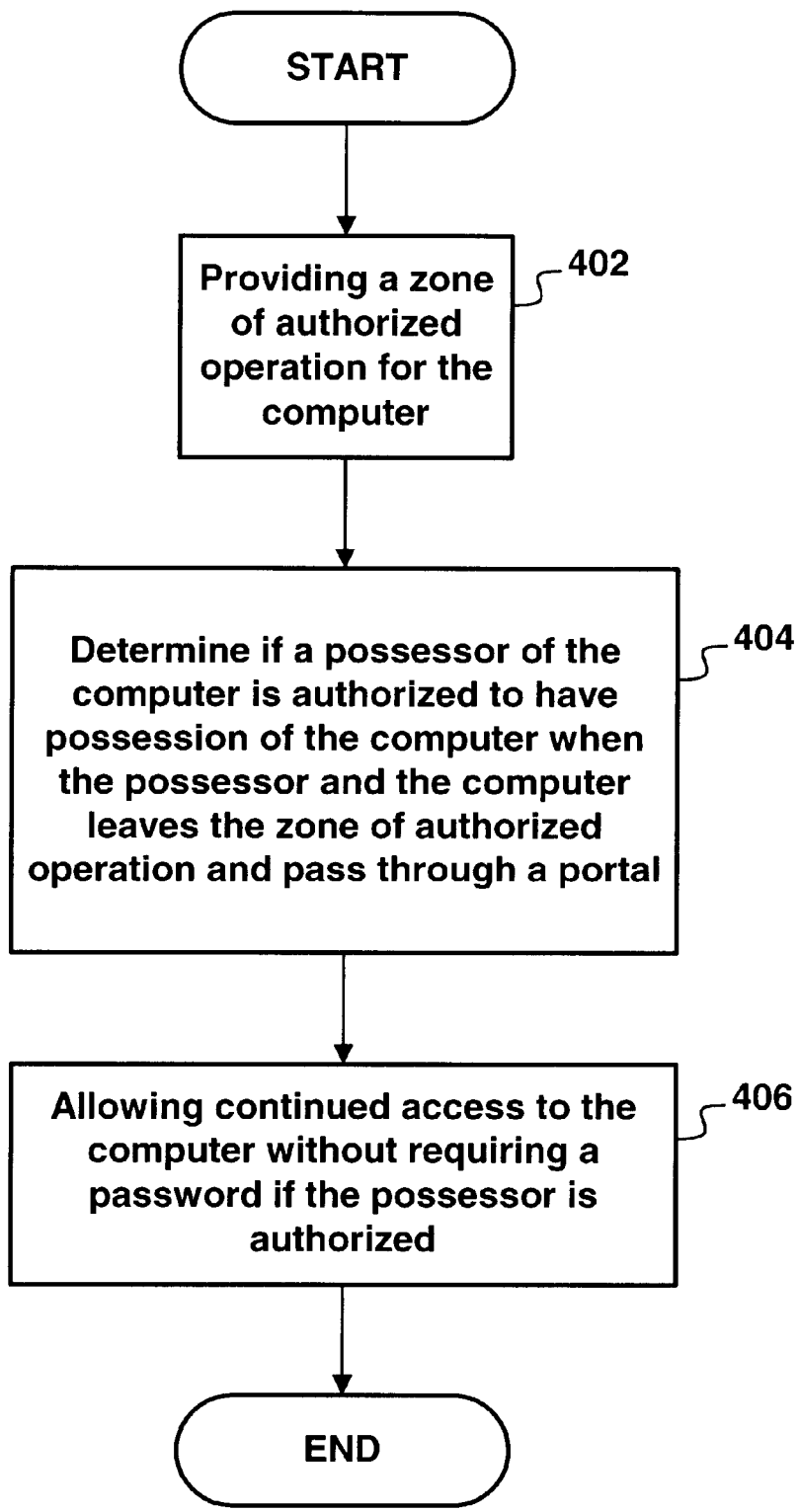
FIG. 4 is a flow chart illustrating a preferred embodiment of a method for securing a computer in accordance with the present invention.

FIG. 4 is a flow chart illustrating a preferred embodiment of a method for securing computers in accordance with the present invention. First, a zone of authorized operation 302 is provided for the computer 306, via step 402. In a preferred embodiment, when the computer 306 leaves the zone of authorized operation 302, it is locked by engaging the locking mechanism 318. Next, when the computer 306 and a possessor 312 of the computer 306 pass through a portal 316, the portal 316 determines if the possessor 312 has authorization to possess the computer 306, via step 404. If so, then the possessor 312 is allowed continued access to the computer 306 without requiring a password, via step 406. In a preferred embodiment, if the possessor 312 does not have authorization, the computer 306 is not unlocked, i.e., it remains locked. If an unauthorized possessor passes through the portal 316, the portal 316 may then activate an alert to notify administrators of the computer systems.

In this manner, the securing of the computer 306 is transparent to the possessor 312. Since the passing of the computer 306 through the portal 316 determines if a possessor 312 is authorized, an authorized possessor 312 does not need to enter a password in order to operate the computer 306 outside of the zone 302. In addition, since the computer 306 must be passed through the portal 316 in order to be operable outside the zone 302, there is no advantage in hiding the computer 306 from the portal 316. If an unauthorized possessor of the computer 306 hides it in a faraday cage, a password will be required to operate the computer 306.

Figure 5:
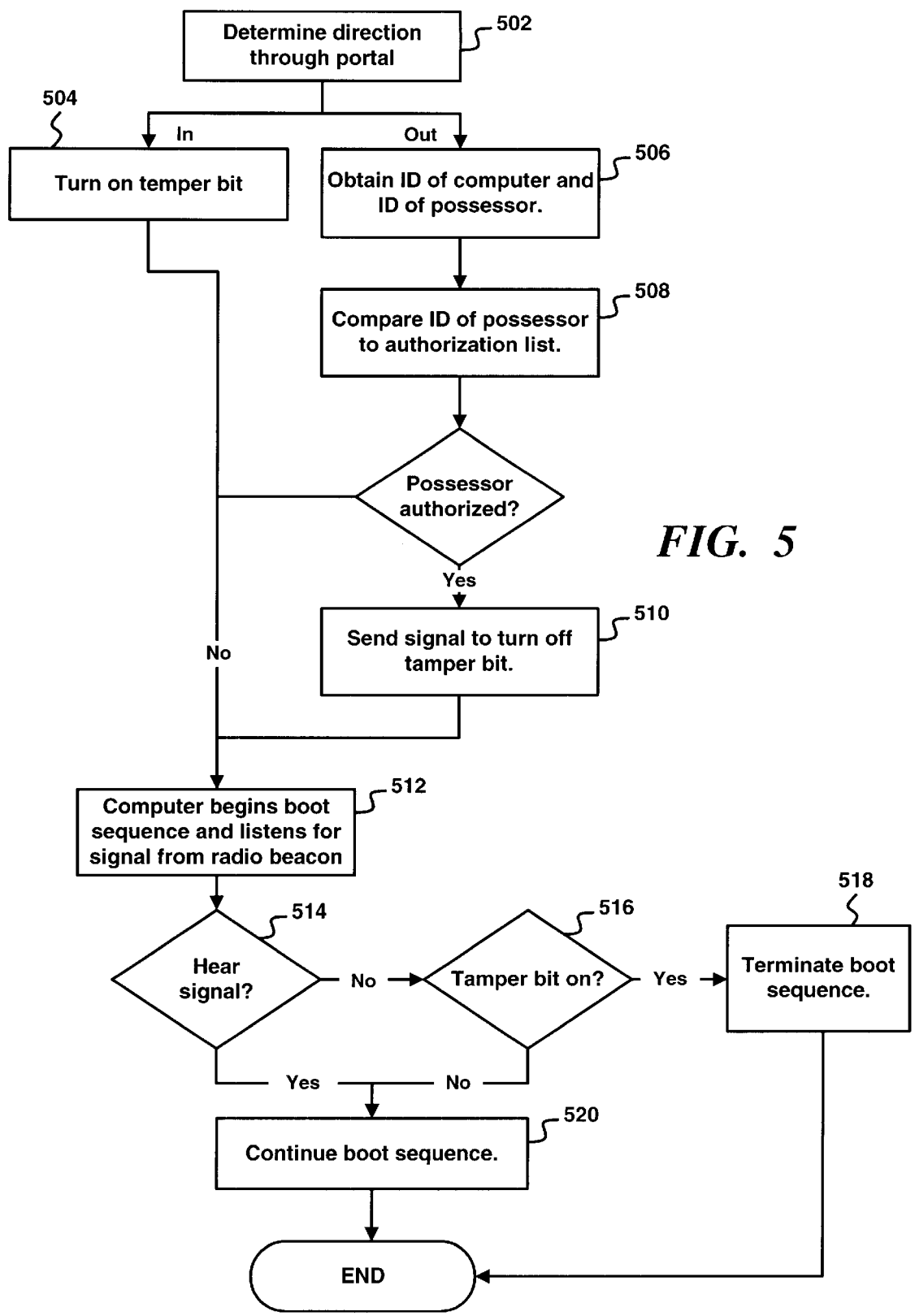
FIG. 5 is a flow chart illustrating in more detail the preferred embodiment of the method for securing a computer in accordance with the present invention.

FIG. 5 illustrates in more detail the preferred embodiment of the method for securing computers in accordance with the present invention. In the preferred embodiment, the locking mechanism 318 is a tamper bit. First, the direction in which he possessor 312 and the computer 306 travel through the portal 316 is determined, via. step 502. If they are traveling "in" through the portal, then the tamper bit residing inside the computer 306 is turned on, via step 504. For example, if a possessor has been using a computer at home and is now returning it to work, then when the possessor and the computer travel through the portal, they are traveling "in" through the portal. If the tamper bit is "on", then the computer is locked.

If the possessor 312 and the computer 306 are traveling "out" through the portal, then the IDs of the computer 306 and the possessor 312 are obtained by the portal, via step 506. For example, if the possessor 312 is leaving work with the computer 306 for use at home, then they are traveling "out" through the portal 316. The ID of the possessor 314 is compared to an authorization list which contains corresponding ID of computers which the possessor 312 is authorized to possess, via step 508. If the possessor 312 is authorized to be in possession of the computer 306, then the portal 316 sends a signal to the computer 306 to turn off the tamper bit 318, via step 510.

When the computer 306 next begins its boot sequence, its radio frequency listening device 308 listens for the signal from the radio beacon 304, via step 512. If the radio frequency listening device 308 hears the signal, then the computer 306 is within the zone of authorized operation 302, and the boot sequence continues, via step 520. In this situation, the tamper bit 318 is not checked. So the fact that the tamper bit 318 is "on" does not affect the operation of the computer 306. Thus, while the computer 306 is within the zone of authorized operation 302, the locking mechanism of the computer 312 is bypassed. If the radio frequency listening device 308 does not hear the signal, then the computer 306 checks if the tamper bit 318 is "on", via step 516. If the tamper bit 318 is "off", then the possessor 312 has been cleared by the portal 316 as having authorization to possess the computer 306, and the boot sequence continues, via step 520. If the tamper bit 318 is "on", then the possessor 312 was not cleared by the portal 316 as having authorization to possess the computer 306, and the boot sequence is terminated, via step 518.

For example, assume the possessor 312 is authorized to possess the laptop computer 306 belonging to his/her employer, and the tamper bit 318 of the computer 306 is turned on. Assume also that the possessor 312 is currently at work with the computer 306. The possessor's work area is within the zone of authorized operation 302 while his/her home is not. When the possessor leaves work with the computer 306 and travels "out" through the portal 316, the ID of the computer 310 and the possessor 314 is obtained, via step 506. The ID of the possessor 314 is compared to the authorization list of corresponding computer identities, via step 508. This comparison shows that the possessor 312 is authorized to possess the computer 306, so the portal 316 sends a signal to the computer 306 to turn off its tamper bit 318, via step 510.

When the possessor reaches home, he/she begins the boot sequence for the computer 306, via step 512. The radio frequency listening device 308 of the computer 306 listens for the signal from the radio beacon 304. Since the possessor's home is not within the zone of authorized operation 302, the radio frequency listening device 308 will not hear the signal. The computer 306 then determines if its tamper bit 318 is on, via step 516. Since the tamper bit 318 has been turned off by the portal 316, the boot sequence is continued, via step 520.

When the possessor 312 returns to work with the computer 306 and travels "in" through the portal 316, the tamper bit 318 on the computer 306 is again turned on, via step 504. When the possessor 312 wishes to use the computer 306 at his/her work area, he/she begins the boot sequence of the computer 306, via step 512. The radio frequency listening device 308 of the computer 306 listens for the signal from the radio beacon 304. Since the possessor 312 is now within the zone of authorized operation 302, the radio frequency listening device 308 hears the signal, and the boot sequence continues, via step 520.

For another example, assume the possessor 312 does not have authorization to possess the computer 306, and the tamper bit 318 of the computer 306 is turned on. If the possessor 312 travels "out" through the portal 316 with the computer 316, the ID of the possessor 314 and the computer 310 is obtained by the portal 316, via step 506. The ID of the possessor 314 is compared to an authorization list of corresponding computer identities, via step 508. Since the possessor 312 is not authorized to be in possession of the computer 306, the signal which would turn off the tamper bit 318 is not sent by the portal 316, i.e., step 510 is not performed. When the possessor 312 next attempts to use the computer 306, he/she begins the boot sequence for the computer 306, via step 512. Since the computer 306 is now outside of the zone of authorized operation 302, its radio frequency listening device 308 will not hear a signal from the radio beacon 304. The computer 306 then checks if its tamper bit 318 is turned on, via step 516. Since the tamper bit 318 was never turned off by the portal 316, it is still on. The boot sequence is then terminated, via step 518, and the computer 306 cannot be used.

Although the present invention is described with the use of a radio beacon to define the zone of authorized operation, one of ordinary skill in the art will understand that other methods of designating the zone may be used without departing from the spirit and scope of the present invention.

Although the present invention is described with the use of an authorization list to determine if a possessor is authorized to possess a particular computer, one of ordinary skill in the art will understand that other methods may be used without departing from the spirit and scope of the present invention.

A method and system for securing computers in a corporate environment has been disclosed. The method and system is transparent to the possessor and provides no advantage in hiding the computer from the portal. The method and system may be easily applied in a corporate environment and is apt for securing mobile computer systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for securing a computer, comprising the steps of:
   (a) providing a zone of authorized operation for the computer;
   (b) determining if a possessor of the computer is authorized to have possession when the computer and the possessor leaves the zone of authorized operation and pass through a portal; and
   (c) allowing continued password unrestricted access to the computer if the possessor is authorized.

2. The method of claim 1, further comprising:
   (d) requiring a password for access to the computer if the possessor is not authorized.

3. The method of claim 1, wherein the determining step (b) comprises:
   (b1) obtaining an identity of the possessor,
   (b2) obtaining an identity of the computer; and
   (b3) determining if the identity of the possessor corresponds to the identity of the computer.

4. The method of claim 3, wherein the determining step (b3) comprises:
   (b3i) comparing the identity of the possessor to an authorization list of corresponding computer identities.

5. The method of claim 1, wherein a tamper bit in the computer is turned on when the computer leaves the zone of authorized operation.

6. The method of claim 1, wherein the allowing step (c) comprises:
   (c1) sending a signal to the computer to turn off a tamper bit; and
   (c2) allowing the computer to be accessed through a boot sequence without requiring a password.

7. The method of claim 2, wherein the requiring (d) comprises:
   (d1) beginning a boot sequence;
   (d2) requiring the possessor to enter a password to access the computer; and
   (d3) terminating the boot sequence when the password is not valid.

8. A method for securing a computer, comprising:
   (a) providing a zone of authorized operation;
   (b) locking the computer when the computer is outside of the zone of authorized operation;
   (c) determining if a possessor of the computer is authorized to have possession when the possessor and the computer pass through a portal; and
   (d) unlocking the computer if the possessor is authorized to have possession.

9. The method of claim 8, wherein the locking step (b) comprises:
   (b1) turning on a tamper bit in the computer.

10. The method of claim 8, wherein the unlocking step (d) comprises:
    (d1) turning off a tamper bit in the computer.

11. The method of claim 8, further comprising:
    (e) sending out an alert if the possessor is not authorized to have possession.

12. The method of claim 8, further comprising sequentially the steps of:
    (e) beginning a boot sequence for the computer;
    (f) determining if a radio frequency listening device in the computer receives a signal from a radio beacon; and
    (g) continuing the boot sequence if the radio frequency listening device receives the signal.

13. The method of claim 12, further comprising sequentially the steps of:
    (h) determining if the computer is locked if the radio frequency listening device does not receive the signal; and
    (i) terminating the boot sequence if step (h) determines that the computer is locked.

14. The method of claim 8, wherein the determining step (c) comprises:
    (c1) obtaining an identity of the possessor,
    (c2) obtaining an identity of the computer; and
    (c3) determining if the identity of the possessor corresponds to the identity of the computer.

15. The method of claim 14, wherein the determining step (c3) comprises:
    (c3i) comparing the identity of the possessor to an authorization list of corresponding computer identities.

16. A system for securing a computer, comprising:
    a means for defining a zone of authorized operation;
    the computer, comprising:
        a means for locking the operation of the computer, and
        a means for bypassing the locking means if the computer is within a zone of authorized operation;
    a possessor of the computer; and
    a portal, comprising:
        a means for determining if the possessor is authorized to have possession of the computer, and
        a means for unlocking the computer if the possessor is authorized to have possession.

17. The system of claim 16, wherein the portal further comprises:

a means for sending out an alert if the possessor is not authorized to have possession.

18. The system of claim 16, wherein the defining means comprises a radio beacon capable of emitting a signal.

19. The system of claim 18, wherein the bypassing means of the computer comprises:
   a radio frequency listening device capable of hearing the signal from the radio beacon; and
   a means for completing a boot sequence for the computer if the radio frequency listening device hears the signal.

20. The system of claim 19, wherein if the radio frequency listening device does not hear the signal, then the boot sequence for the computer is not completed.

21. The system of claim 16, wherein the determining means of the portal comprises:
   a means for obtaining an identity of the possessor;
   a means for obtaining an identity of the computer; and
   a means for determining if the identity of the possessor corresponds to the identity of the computer.

22. The system of claim 21, wherein the determining means comprises:
   a means for comparing the identity of the possessor to an authorization list of corresponding computer identities.

23. The system of claim 16, wherein the locking means of the computer comprises a tamper bit.

24. The system of claim 23, wherein the unlocking means of the portal comprises:
   a means for turning off the tamper bit.

25. A method for securing a computer, comprising:
   (a) providing a zone of authorized operation;
   (b) locking the computer when the computer is outside of the zone of authorized operation;
   (c) obtaining an identity of the computer and an identity of a possessor of the computer when the possessor and the computer pass through a portal;
   (d) determining if the identity of the possessor corresponds to the identity of the computer; and
   (e) unlocking the computer if the identity of the possessor corresponds to the identity of the computer.

26. The method of claim 25, wherein the locking step (b) comprises:
   (b1) turning on a tamper bit in the computer.

27. The method of claim 25, wherein the unlocking step (e) comprises:
   (e1) turning off a tamper bit in the computer.

28. The method of claim 25, further comprising:
   (f) sending out an alert if the identity of the possessor does not correspond to the identity of the computer.

29. The method of claim 25, further comprising sequentially the steps of:
   (f) beginning a boot sequence of the computer;
   (g) determining if a radio frequency listening device in the computer receives a signal from a radio beacon; and
   (h) continuing the boot sequence if the radio frequency listening device receives the signal.

30. The method of claim 29, further comprising sequentially the steps of:
   (i) determining if the computer is locked if the radio frequency listening device does not receive the signal; and
   (j) terminating the boot sequence if step (i) determines that the computer is locked.

31. The method of claim 25, wherein the determining step (d) comprises (d1) comparing the identity of the possessor to an authorization list of corresponding computer identities.

32. A system for securing a computer, comprising:
   a means for defining a zone of authorized operation;
   the computer, comprising:
      a means for locking the operations of the computer, and
      a means for bypassing the locking means if the computer is within a zone of authorized operation;
   a possessor of the computer; and
   a portal, comprising:
      a means for obtaining an identity of the possessor,
      a means for obtaining an identity of the computer,
      a means for determining if the identity of the possessor corresponds to the identity of the computer, and
      a means for unlocking the computer if the identity of the possessor corresponds to the identity of the computer.

33. The system of claim 32, wherein the portal further comprises:
   a means for sending out an alert if the identity of the possessor does not correspond to the identity of the computer.

34. The system of claim 32, wherein the defining means comprises a radio beacon capable of emitting a signal.

35. The system of claim 34, wherein the bypassing means of the computer comprises:
   a radio frequency listening device capable of hearing the signal from the radio beacon; and
   a means for completing a boot sequence for the computer if the radio frequency listening device hears the signal.

36. The system of claim 35, wherein if the radio frequency listening device does not hear the signal, then the boot sequence for the computer is not completed.

37. The system of claim 32, wherein the determining means of the portal comprises:
   a means for comparing the identity of the possessor to an authorization list.

38. The system of claim 32, wherein the locking means of the computer comprises a tamper bit.

39. The system of claim 38, wherein the unlocking means of the portal comprises:
   a means for turning off the tamper bit.

40. A method for securing a computer, comprising:
   (a) providing a zone of authorized operation;
   (b) turning on a tamper bit of the computer when the computer is outside of the zone of authorized operation;
   (c) obtaining an identity of the computer and an identity of a possessor of the computer when the possessor and the computer pass through a portal;
   (d) comparing the identity of the possessor to an authorization list of corresponding computer identities; and
   (e) turning off the tamper bit if the identity of the possessor corresponds to the identity of the computer based on the authorization list.

41. The method of claim 40, further comprising sequentially the steps of:
   (f) beginning a boot sequence for the computer;
   (g) determining if a radio frequency listening device of the computer hears a signal from a radio beacon;
   (h) continuing the boot sequence if the radio frequency listening device hears the signal;
   (i) determining if the tamper bit is on if the radio frequency listening device does not hear the signal;
   (j) terminating the boot sequence if step (j) determines that the tamper bit is on; and (k) sending out an alert if the identity of the possessor does not correspond to the identity of the computer.

42. A system for securing a computer, comprising:

a radio beacon capable of emitting a signal for defining a zone of authorized operation;

the computer, comprising:
   a radio frequency listening device capable of hearing a signal from a radio beacon, and
   a tamper bit;

a possessor of the computer; and a portal, comprising:
   a means for obtaining an identity of the possessor,
   a means for obtaining an identity of the computer,
   a means for comparing the identity of the possessor to an authorization list of corresponding computer identities, and
   a means for turning the tamper bit on or off, the turning means capable of turning off the tamper bit if the identity of the possessor corresponds to the identity of the computer based on the authorization list.

43. A system for securing a computer, comprising:

a zone module which defines a zone of authorized operation;

the computer, comprising:
   a lock which locks the operation of the computer, and
   a bypass module which bypasses the lock if the computer is within a zone of authorized operation;

a possessor detector which identifies the possessor of the computer and generates a possessor identification signal; and a portal, comprising:
   an authorization module which determines if the possessor identification signal is authorized, and
   a unlock module which unlocks the computer if the possessor identification signal is authorized.

* * * * *